(12) United States Patent
Molko

(10) Patent No.: US 6,920,115 B2
(45) Date of Patent: Jul. 19, 2005

(54) TIME-DIVISION MULTIPLEX RADIO COMMUNICATION METHOD, TRANSMITTER AND RECEIVER FOR IMPLEMENTING SUCH METHOD

(75) Inventor: Christophe Molko, Suresnes (FR)

(73) Assignee: Matra Nortel Communications, Qiumper (FR)

(*) Notice: Subject to any disclaimer, the term of this patent is extended or adjusted under 35 U.S.C. 154(b) by 858 days.

(21) Appl. No.: 09/730,906

(22) Filed: Dec. 6, 2000

(65) Prior Publication Data

US 2002/0009065 A1 Jan. 24, 2002

(30) Foreign Application Priority Data

Dec. 10, 1999 (FR) .......................................... 99 15600

(51) Int. Cl.[7] ................................................ H04B 3/20
(52) U.S. Cl. ..................................... 370/320; 370/292
(58) Field of Search ............................... 370/320, 335, 370/228, 292, 203, 465

(56) References Cited

U.S. PATENT DOCUMENTS

| | | | | |
|---|---|---|---|---|
| 5,212,715 A | * | 5/1993 | Pickert et al. | 375/366 |
| 5,400,362 A | * | 3/1995 | Chennakeshu et al. | 375/285 |
| 5,729,538 A | | 3/1998 | Dent | |
| 5,809,017 A | | 9/1998 | Smith et al. | |
| 5,909,465 A | * | 6/1999 | Bottomley et al. | 375/227 |
| 6,269,116 B1 | * | 7/2001 | Javerbring et al. | 375/229 |

* cited by examiner

*Primary Examiner*—Duc Ho
*Assistant Examiner*—Thien Tran
(74) *Attorney, Agent, or Firm*—Trop, Pruner & Hu, P.C.

(57) ABSTRACT

A transmitter produces radio signal bursts in periodic time slots allocated to a time-division multiplexed channel. The radio signal of each burst is made up of digital symbols comprising two training sequences enabling the receiver to estimate demodulation parameters and information symbols which the receiver can estimate by a demodulation applied using the estimated parameters. The two training sequences are placed at the start and the end of the burst so that the receiver uses them to demodulate the received signal in the order of the symbols and demodulate the received signal again in the reverse order of the symbols.

15 Claims, 3 Drawing Sheets

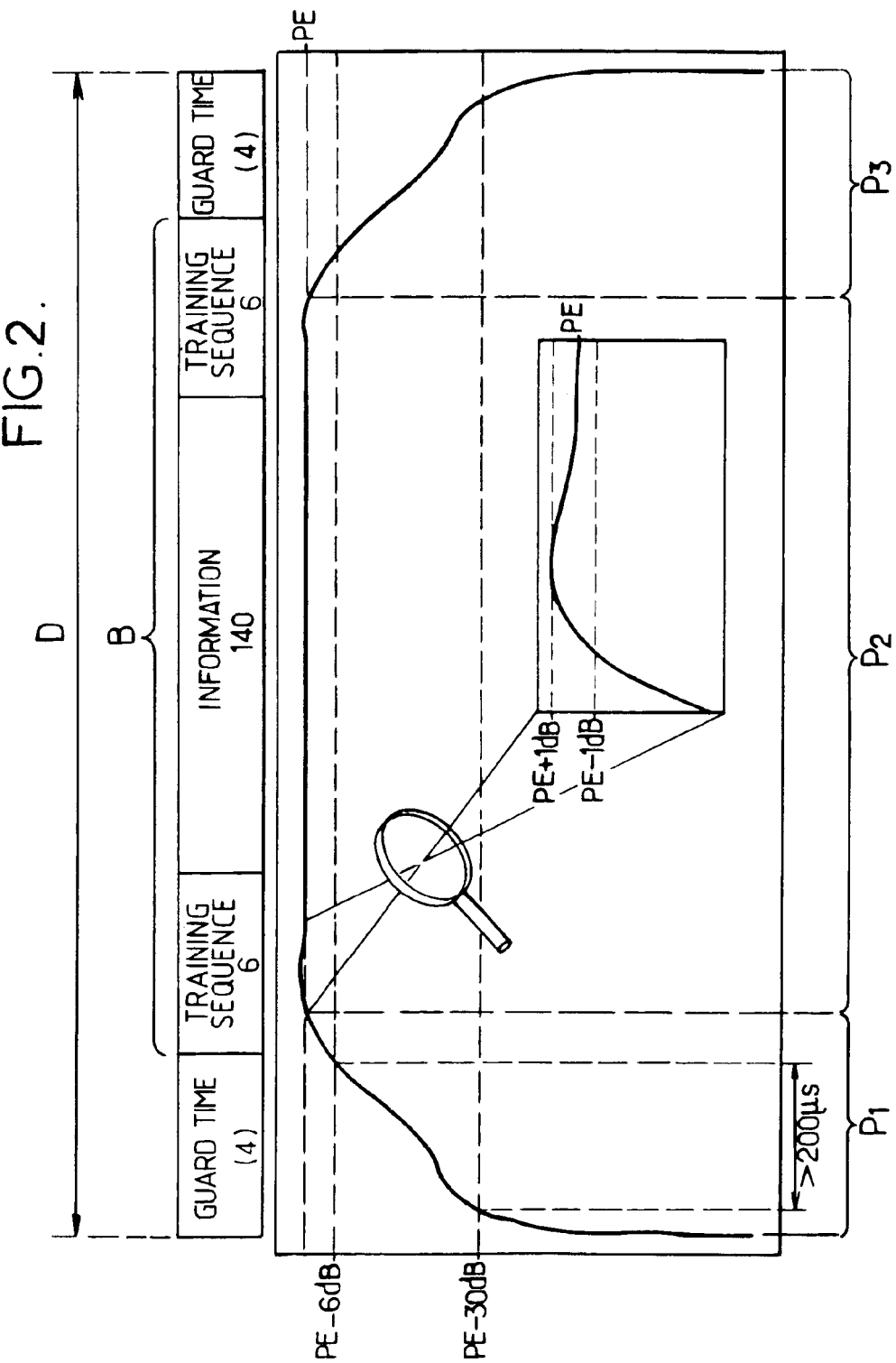

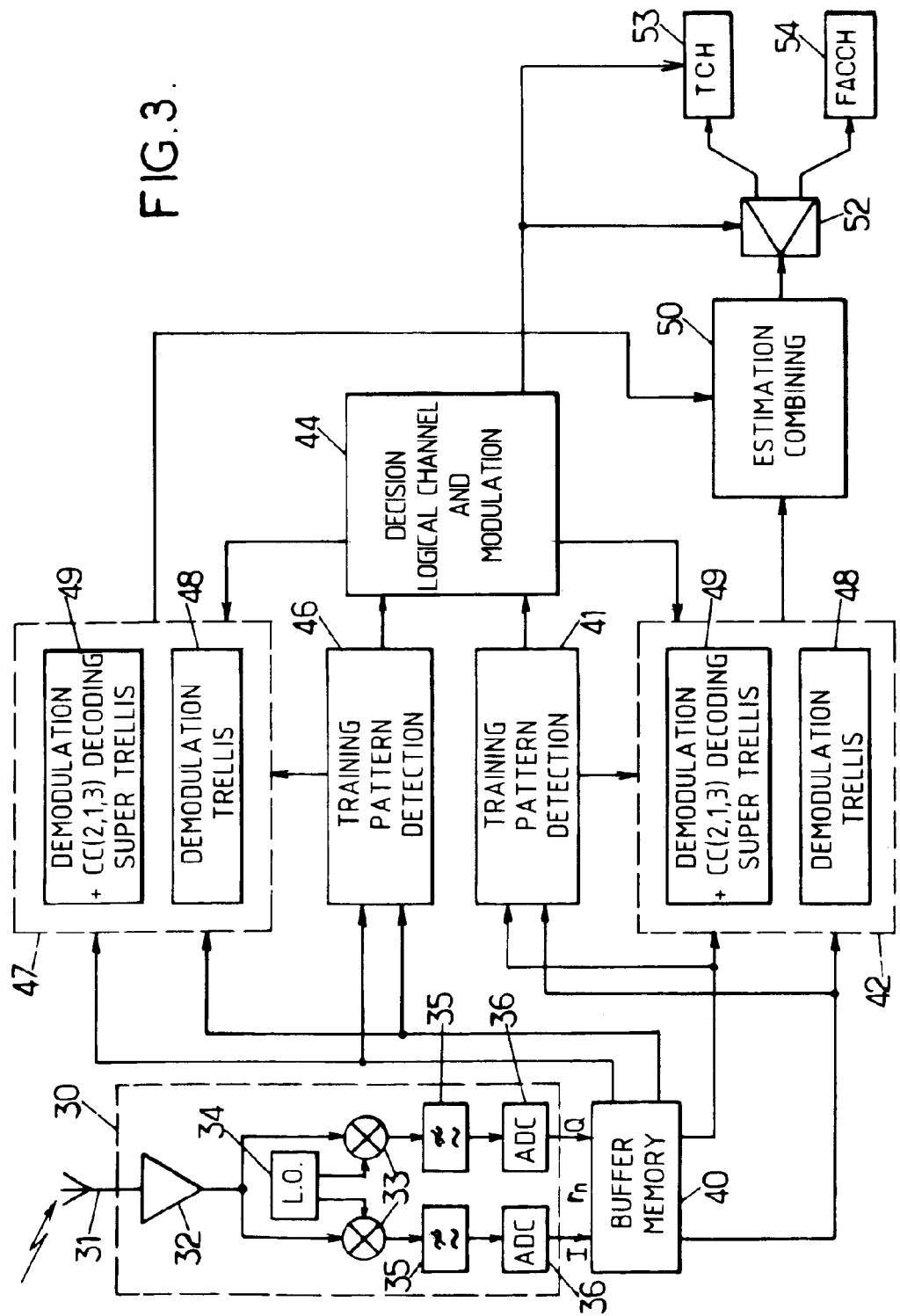

TIME-DIVISION MULTIPLEX RADIO COMMUNICATION METHOD, TRANSMITTER AND RECEIVER FOR IMPLEMENTING SUCH METHOD

BACKGROUND OF THE INVENTION

The present invention relates to radio communication systems using a time division channel multiplex on a carrier frequency.

The time division multiplex may relate to a time-division multiple access (TDMA) scheme, whereby multiple channels are set up between a transceiver, for example a base station of a cellular network, and several transceivers, for example mobile telephones. The time division multiplex may also be used to provide communications in duplex mode between two stations, with time slots allocated alternately in the two directions of communication (TDD—time-division duplex).

In a TDMA or TDD system, a transmitter produces bursts of radio signals in given time slots of a frame structure, allocated to a channel set up with one or more receivers. Such a burst contains a certain number of information symbols to be communicated to the receiver. In many systems, it will also contain training symbols known to the receiver in advance, enabling it to obtain parameters needed to demodulate the received signal in order to estimate the information symbols. These parameters relate to the time and/or frequency synchronisation of the receiver and to the estimation of the propagation channel if the receiver performs coherent demodulation.

In TDMA systems, such as the European GSM radio telephony system, the training symbols form a sequence located in the middle of the burst, so that the demodulation parameters which they enable to be estimated exhibit minimum sensitivity to the variation in time of the propagation channel. In the specific case of GSM, this central training sequence is made up of 26 bits which are known a priori, preceded and followed by information sequences of 58 bits, the 26-bit sequence being used to track the synchronisation of mobiles with the base station and estimate the parameters required by the Viterbi equaliser incorporated in the demodulator.

In radio communication systems which do not use time-division multiplexing, receivers have been proposed which demodulate a segment of the received radio signal twice, once in the direction of increasing times (forward) and once in the direction of decreasing times (backward), in order to enhance the reliability of the estimated information symbols. In each direction, the demodulation involves estimating demodulation parameters at one end of the segment and scanning from this end of the segment to the other end in order to estimate the transmitted symbols. The two sets of estimated symbols thus obtained can then be combined in order to improve the binary error rate on the channel as compared with demodulation in a single direction. A training sequence is inserted at regular intervals in the continuous flow of symbols modulated on the carrier in question and the segment processed by the receiver in the two directions starts and ends with the signals corresponding to two consecutive occurrences of the modulated training sequence used to estimate the demodulation parameters. Examples of such forward/backward demodulators are described in EP-A-0 821 500 and EP-A-0 821 501.

This forward/backward demodulation makes the receiver less sensitive to deep fades in the channel due to destructive interference between the multiple propagation paths. However, the way it is applied is not suitable for time-division multiplexed radio signals.

An object of the present invention is to enable forward/backward modulation methods to be applied in such time-division multiplex systems.

SUMMARY OF THE INVENTION

Accordingly, the invention proposes a method time-division multiplex radio communication method, wherein a transmitter transmits radio signal bursts destined for at least one receiver in time slots allocated to a channel on a carrier frequency, wherein the radio signal of each burst consists of a block of digital symbols including training symbols provided for an estimation of demodulation parameters by the receiver and information symbols to be estimated by the receiver by a demodulation using the estimated parameters. According to the invention, the training symbols comprise a first sequence of symbols placed at the start of the block from which each radio signal burst is formed and a second sequence of symbols placed at the end of said block. Each radio signal burst comprises an initial portion in which the radio signal rises in power up to a range of transmission power, a central portion in which the radio signal is transmitted within said power range and a final portion in which the radio signal decreases in power from said power range, so that at least one of the first and second sequences of training symbols gives rise to a modulation of the radio signal of the burst outside the central portion. The receiver receiving a signal segment corresponding to a burst formed from a symbol block executes the steps of:

estimating first demodulation parameters on the basis of the first sequence of training symbols and the start of the signal segment;

calculating first estimations of the information symbols of said block on the basis of the first demodulation parameters and the signal segment scanned from start to end;

estimation of second demodulation parameters on the basis of the second sequence of training symbols and the end of the signal segment; and calculation of second estimations of the information symbols of said block on the basis of the second demodulation parameters and the signal segment scanned from end to start.

Using two training sequences at the start and end of the burst enables demodulation to be effected on a forward/backward basis. These two sequences are relatively short, compared with the single sequences usually used in TDMA signal bursts and preferably distinct from each other so as to optimise the statistical de-correlation properties with the signal resulting from the information symbols transmitted in the burst.

By overlapping the training sequences on the rising and decreasing power ramps at one or the other of the two ends of the burst, maximum space can be reserved for transmission of the information bits, thereby optimising the transmission rate on the channel. The overlap of the training sequences on the power ramps is adjusted to conserve a high probability that these sequences will be detected in the received signal and high reliability of the demodulation parameters estimated from them.

In order to limit interference in the adjacent channels, the radio signals of variable amplitude transmitted in the initial portion of a burst before the first sequence of training symbols and in the final portion of the burst after the second sequence of training symbols are preferably obtained from baseband signals having a constant phase.

In one particularly advantageous embodiment, the transmitter selects at least one of the first and second sequences of training symbols, inserted in the block of symbols from which each radio signal burst is formed, from a set of several predetermined sequences, depending on signalling information to be transmitted to the receiver.

The transmitter can then transmit the signalling information to the receiver without having to reserve transmission rate resources for this purpose. It will merely have to select the training sequences from a given set of sequences having good auto- and cross-correlation properties.

The signalling information thus transmitted may indicate the logical channel to which the burst belongs if the time-multiplexed channel supports several separate logical channels. Logical channels are then multiplexed dynamically, burst by burst. It may also indicate the modulation by which the burst is formed if the system supports several modulation schemes having different properties.

Another aspect of the present invention relates to a time-division channel multiplexing radio communication transmitter, comprising means for transmitting radio signal bursts destined for at least one receiver in time slots allocated to a channel on a carrier frequency, wherein the transmission means comprise means for forming the radio signal of each burst from a block of digital symbols including training symbols provided for an estimation of demodulation parameters by the receiver and information symbols to be estimated by the receiver by a demodulation using the estimated parameters, wherein the training symbols comprise a first sequence of symbols placed at the start of the block of symbols from which each radio signal burst is formed and a second sequence of symbols placed at the end of said block, and wherein the transmission means further comprise power adjustment means controlled to provide each radio signal burst with an initial portion in which the radio signal rises in power up to a range of transmission power, a central portion in which the radio signal is transmitted within said power range and a final portion in which the radio signal decreases in power from said power range, whereby at least one of the first and second sequences of training symbols gives rise to a modulation of the radio signal of the burst outside the central portion.

BRIEF DESCRIPTION OF THE DRAWINGS

FIGS. 1 and 3 are synoptic diagrams respectively of a radio communication transmitter and receiver for implementing the invention.

FIG. 2 is a diagram illustrating the burst format used in a method according to the invention and a corresponding power transmission profile.

DESCRIPTION OF PREFERRED EMBODIMENTS

Figure 1:
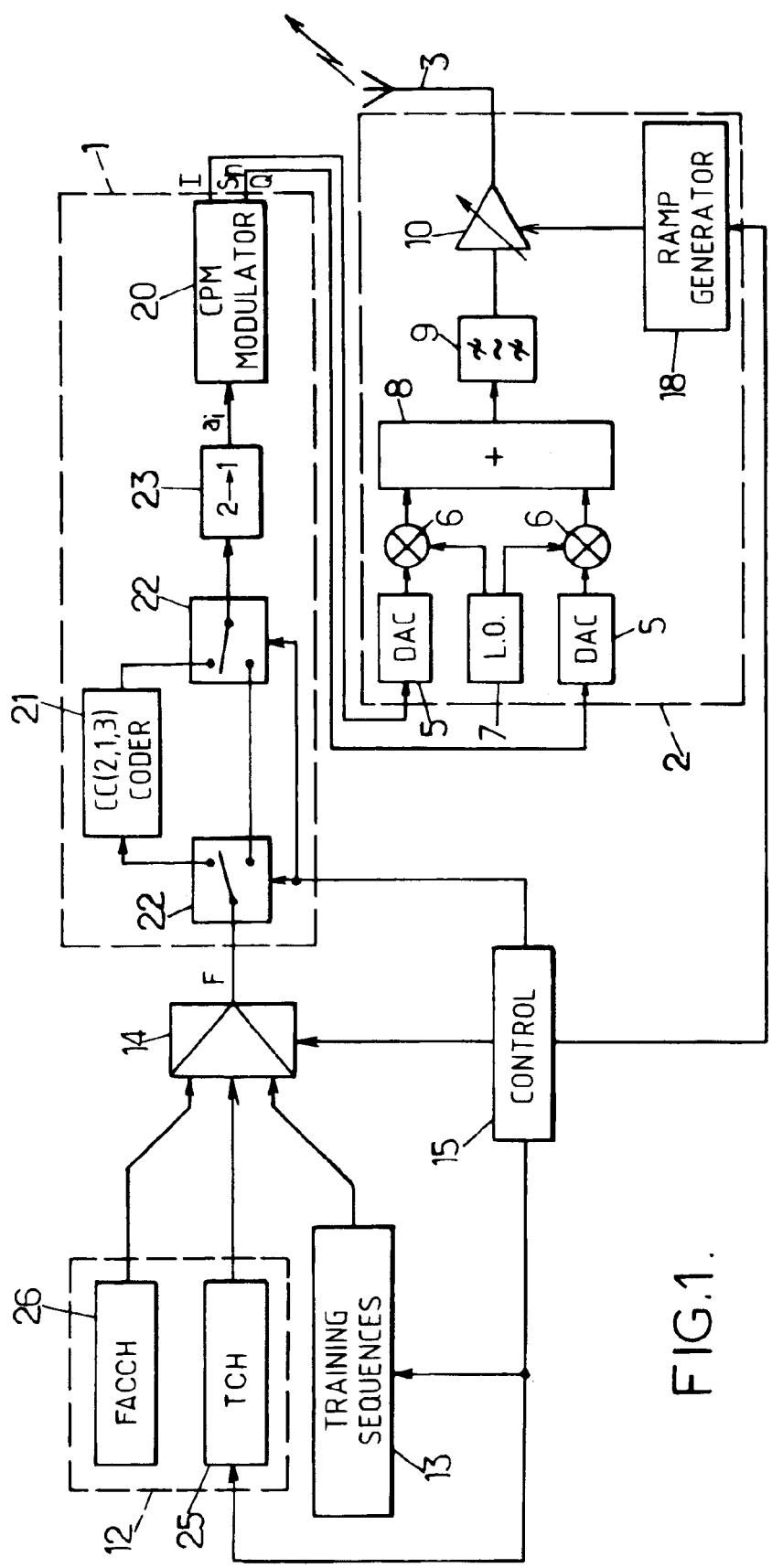

The radio transmitter exemplified in FIG. 1 has a digital modulation unit 1 generating a complex baseband signal $s_n$ from a flow F of discrete symbols. The complex baseband signal, sampled at a frequency $F_e$, has a real part (I) and an imaginary part (Q) applied to a radio stage 2 which shapes the radio signal transmitted by the antenna 3 of the transmitter.

The radio stage 2 comprises: two digital-to-analog (D/A) converters 5 which receive the real and imaginary parts of the complex digital signal $s_n$, respectively; two mixers 6 which modulate two quadrature radio frequency waves of a same frequency, supplied by a local oscillator 7, with the analog signals supplied respectively by the D/A converters 5; an adder 8 which computes the sum of the two modulated waves and applies it to a transmission filter 9; and a power amplifier 10 which feeds the amplified output signal from the filter 9 to the antenna 3.

The flow F is made up of discrete symbols, for example binary ($\pm 1$) or M-ary ($\pm 1$, $\pm 3$, ..., $\pm(M-1)$), namely information symbols output by a source 12 and training symbols output by a sequence generator 13.

The symbol source 12 illustrated by a diagrammatic block in FIG. 1 issues coded information symbols containing the traffic information (voice, data, image, etc.), the nature and form of which depend on the radio communication system to which the transmitter belongs, as well as various items of signalling information used to operate the system. For one or more types of information, the source 12 may have, in a conventional manner, a channel encoder which adds redundancy to the symbols to be transmitted and/or applies time interleaving in order to protect these symbols from transmission errors.

The sequence generator 13 outputs training symbols which the receiver uses, as it detects them, to acquire synchronisation information and/or estimate the parameters of the radio propagation channel. Each training sequence is constructed in a conventional manner taking account of the statistical properties of the resultant training pattern in the complex signal $s_n$ after modulation.

A multiplexer 14, controlled by a control unit 15 of the transmitter, assembles the flow F from the symbols arriving from the source 12 and the generator 13, in the form of blocks which occur successively and periodically, each having a given number of symbols. After modulation, a block output by the multiplexer 14 will give rise to a transmitted radio signal burst.

The transmitter belongs to a radio system with time-division multiplexing of order $N \geq 2$, in which access to a carrier frequency is distributed between P transmitters ($P \leq N$) in consecutive frames sub-divided into N time slots. A physical channel is defined by a carrier and a time slot index in the frames. Each radio signal burst relating to a physical channel is transmitted within a time slot allocated to this channel.

One advantageous burst format is illustrated in FIG. 2. In this example, the time slots of the frame are of a duration D=20 ms and the modulating symbols $a_i$ are quaternary and of a rate 1/T=8000 symbols per second (T=125 $\mu$s). Each 20 ms burst starts and ends with a guard time of 0.5 ms (4 symbol times), during which the transmitted radio signal results from a signal $s_n$ having a constant phase. The block of modulating symbols B starts and ends with a sequence of 6 training symbols output by the generator 13. These two training sequences are on both sides of a sequence of 140 information symbols output by the source 12.

The bottom part of FIG. 2 also shows the transmission power profile of a radio signal burst. This profile is obtained, e.g., by controlling the gain of the power amplifier 10 using a ramp generator 18 which the control unit 15 synchronises with the production of the radio signal burst.

This power profile is symmetrical relative to the instant at the middle of the burst. The 20 ms burst consists of an initial portion P1 when the power of the radio signal rises up to a specified power range, a central portion P2 at which the radio signal is transmitted within the specified range and a final portion P3 when the power of the radio signal is falling from the specified range.

The transmission power range in the central portion P2 is specified as a function of the required transmission power PE, which may be dynamically regulated depending on the radio propagation conditions. As the magnified profile in FIG. 2 shows, this range is from PE−1 dB to PE+1 dB, for example, which complies with the specifications of standard ETS 300 113 (2nd edition, Jun. 1996), published by the European Telecommunications Standards Institute (ETSI).

In order to comply with this standard, the peak power in the adjacent channels must be below PE−50 dB and the rising or falling portion of the power profile of the radio signal between PE−30 dB and PE−6 dB must be monotonous and longer than 200 µs.

It may be noted from FIG. 2 that the two training sequences of block B overlap with portions P1 and P3 of the burst, i.e. they modulate the burst radio signal outside the central portion P2 of specified power. This somewhat affects the capacity of the receiver to detect these sequences and extract the information looked for about the channel characteristics. However, this is not too problematic because the receiver has a priori knowledge about the symbols of the training sequences. On the other hand, it enables the time available in the burst for transmitting the unknown information symbols to be maximised. Accordingly, it is possible to comply with the spectral constraints imposed by standard ETS 300 113 in our example, without affecting too much the information transmission rate available on the channel.

Before the first training sequence and after the second, the fact that the variable amplitude radio signal transmitted in portions P1 and P3 is not phase modulated also limits any interference between adjacent channels which might be caused by de-synchronisation of the transmitters relative to the multiplex frames, due to the radio propagation time inside each cell covered. The duration of the guard time at the ends of the burst is adapted to the foreseeable propagation times within the system (0.5 ms corresponds to a 75 km cell).

The sequence generator 13 is controlled by the unit 15 to insert training sequences in each block B, selected from a given set of sequences on the basis of signalling information. In the example described here, this signalling information, fed to the receiver, is used (i) to multiplex logical channels on a given physical transmission channel and (ii) to identify the modulation scheme used to generate the radio signals.

The modulation unit 1 of the transmitter of FIG. 1 is a dual mode modulator which may use two modulation schemes.

It comprises a continuous phase modulator (CPM) 20, which, depending on the M-ary symbols $a_i$ fed at the rate 1/T, produces for $p.T \leq t < (p+1).T$ a waveform $$S(t) = \exp\left[2j\pi h \cdot \left(\sum_{i=-\infty}^{p} a_j \cdot q(t - i \cdot T)\right)\right]$$

where h is the modulation index and q(t) the phase pulse of the modulation, with q(t)=1 for $t \geq K.T$, K being the memory of the modulation expressed as a number of M-ary symbols. The waveform S(t) is sampled at the frequency $F_e$ to shape the baseband signal $s_n$. In the example illustrated in FIG. 1, the symbols of the flow F are binary at values 0 or 1 and converted into quaternary symbols $a_i$ with values ±1 and ±3 by a unit 23 at the input of the CPM modulator 20.

Since the radio signal is linearly phase-modulated, the baseband signals of constant phase during the guard times may result from the four symbols $a_i$ preceding and following the block B in each burst being set to zero at the input of the modulator 20.

The dual mode modulator 1 further has a redundancy coder 21 operating on the basis of the convolutional code CC(2,1,3), for example. This coder 12 is activated upstream of the CPM modulator 20 only if switches 22 are positioned accordingly by the control unit 15. The dual mode modulator 1 processes the flow of symbols F output by the multiplexer 14. When the convolutional coder 21 is in service, the dual mode modulator 1 applies a coded modulation (see G. Ungerboeck "Channel Coding with Multilevel/Phase Signals", IEEE Transactions on Information Theory, Vol. IT-28,No. 1, Jan. 1982). When the convolutional coder 21 is not in service, the modulation is not coded and the rate of the symbols in the flow F is doubled. In principle, coded modulation secures better transmission quality but at a lower transmission rate (see EP-A-0 896 443).

In the example illustrated in FIG. 1, the symbol source 12 has a unit 25 transmitting on a traffic channel (TCH), with a symbol flow rate selected by the control unit 15 to comply with the type of modulation applied. The source 12 also has a unit 26 defining a fast associated control channel (FACCH), on which coded modulation is always applied. The distinction between the TCH and FACCH logical channels is performed by the control unit 15 which controls the multiplexer 14.

The training sequence generator 13 is arranged to insert two distinct training patterns per burst of the baseband signal $s_n$. The corresponding sequences are determined beforehand in a conventional manner, minimising the cross-correlations between the patterns which they generate in the complex baseband signal $s_n$.

TABLE I

| Logical channel/modulation | 1st sequence | 2nd sequence |
|---|---|---|
| FACCH/coded | | |
| Binary sequence (F) | 0 1 0 1 0 1 | 0 1 0 0 0 1 |
| Quaternary sequence ($a_i$) | −3 −1 −3 +3 −3 +3 | −3 −1 −3 −1 −3 −1 |
| TCH/coded | | |
| Binary sequence (F) | 0 0 1 0 0 1 | 1 1 1 0 1 1 |
| Quaternary sequence ($a_i$) | −3 −3 +1 −3 −1 +1 | −1 −1 +3 −1 −1 +1 |
| TGH/non coded | | |
| Binary sequence (F) | 1 0 0 0 0 1 1 0 1 0 1 0 | 0 1 0 1 0 1 1 0 1 1 0 1 |
| Quaternary sequence ($a_i$) | −1 −3 +1 −1 −1 −1 | +1 +1 +1 −1 +3 +1 |

By way of example, if the CPM modulator 20 applies quaternary modulation with an index ⅓ described as an example in EP-A-0 936 784, the patterns may be generated from the sequences of symbols given in Table 1, the first sequence of each block being preceded by the symbols $a_i$ set to zero (signal $s_n$ in constant phase) and followed by the information symbols that are unknown a priori, whereas the second sequence of each frame is preceded by the symbols that are unknown a priori and followed by the symbols $a_i$ set to zero.

The receiver illustrated in FIG. 3 has a radio stage 30, which regenerates a complex baseband signal $r_n$ from the radio signal picked up by the antenna 31. The radio stage 30 comprises: a low noise amplifier 32; two mixers 33 which multiply two quadrature radio frequency waves at the carrier frequency, output by a local oscillator 34, by the amplified radio signal; two filters 35 for receiving two quadrature components output by the mixers 33; and two analog-to-digital (A/D) converters 36 which output the real (I) and imaginary (Q) parts of the complex digital signal $r_n$.

Segments of the received complex signal $r_n$, each corresponding to a transmitted burst, are temporarily stored in a buffer memory 40.

A first reading of the memory 40 in the direction of increasing time (forward) applies each received signal segment $r_n$ firstly to a module 41 which detects training patterns and secondly to a demodulator 42 which is used to estimate, by a coherent demodulation, the information symbols output by the source 12 of the transmitter.

In a conventional manner, the module 41 uses the presence of training sequences at the start of the transmitted signal bursts to calculate demodulation parameters RC useful to the demodulator 42, representing the estimated impulse response of the radio propagation channel. The demodulator 42 estimates the information symbols transmitted in the burst on the basis of the segment scanned in the forward direction and the parameters RC calculated by the module 41 at the start of the segment. Besides, the module 41 can obtain time synchronisation information for the demodulator 42 in a known manner, and optionally frequency synchronisation information for the radio stage 30 of the receiver so as to adjust the frequency of its oscillator 34 to align it with the carrier frequency used by the transmitter.

By calculating correlations of the signal $r_n$ with the different training patterns resulting from the sequences of the second column of Table 1, the module 41 determines which is the sequence present at the start of the block of transmitted symbols (i.e. that for which the normalized correlation is maximum) and updates the channel estimation on the basis of the calculations performed with this sequence. An identification of this sequence is supplied to the decision module 44 of the receiver.

A second reading of the memory 40 in the direction of decreasing time (backward) applies each received signal segment $r_n$ firstly to a module 46 which detects training patterns and secondly to a demodulator 47. The module 46 operates in the same way as the module 41 described above. The demodulator 47 estimates the information symbols transmitted in the burst on the basis of the segment scanned in the backward direction and the parameters RC calculated by the module 46 at the end of the segment. By calculating correlations of the signal $r_n$ with different training patterns resulting from the sequences of the third column of Table I, the module 46 determines which is the sequence present at the end of the block of transmitted symbols and updates the channel estimation on the basis of the calculations performed with this sequence. An identification of this sequence is supplied to the decision module 44 of the receiver.

The decision module 44 recovers the coded signalling information from the two sequences detected by the modules 41 and 46, i.e. it identifies the modulation used by the transmitter as well as the logical channel to which the signal burst pertains.

The demodulators 42 and 47 are identical (they may consist of a single demodulator operating alternately on the forward signal and on the backward signal). They may operate in a conventional manner using the Viterbi algorithm, using either a simple demodulation trellis 48 in the case of non-coded modulation on the TCH channel or a supertrellis 49 integrating the modulation and convolutional coding states in order to obtain the gain of the coded modulation on the TCH or the FACCH. The trellis may be initialised with the training symbols adjacent to the symbols to be demodulated.

The estimations of information symbols respectively output by the demodulators 42 and 47 are combined by a unit 50 to produce final estimations which are more reliable due to the distinct demodulations which have been carried out. By way of example, the unit 50 may combine soft estimations of the symbols using the MRC method (maximum ratio combining). Other possible combinations are described in EP-A-0 821 500 and EP-A-0 821 501.

Depending on the signalling information extracted by the module 44, the latter issues commands to:
- the demodulators 42 and 47 to activate either the demodulation trellis 48 or the supertrellis for coded modulation 49;
- the demultiplexer 52 which directs the flow of symbols output by the unit 50 either to the units 53 for processing the traffic channel TCH or to the units 54 processing the signalling channel FACCH;
- the units 53 processing the traffic channel TCH to indicate what the transmission rate is on this channel.

The radio communication system incorporating the transmitters illustrated in FIG. 1 and the receivers illustrated in FIG. 3 have the advantage of enabling an associated signalling channel to be inserted in a traffic channel by a "frame stealing" type of mechanism without adding overhead, i.e. without specifically reserving information symbols in the block transmitted in each burst to indicate the type of logical channel. It is also of advantage to be able to select frame by frame the modulation scheme used, which enables the instantaneous flow rate on the channel to be dynamically adapted.

What is claimed is:

1. A time-division multiplex radio communication method, wherein a transmitter transmits radio signal bursts destined for at least one receiver in time slots allocated to a channel on a carrier frequency, wherein the radio signal of each burst is formed from a block of digital symbols including training symbols provided for an estimation of demodulation parameters by the receiver and information symbols to be estimated by the receiver by a demodulation using the estimated parameters, wherein the training symbols comprise a first sequence of symbols placed at the start of the block from which each radio signal burst is formed and a second sequence of symbols placed at the end of said block, wherein each radio signal burst comprises an initial portion in which the radio signal rises in power up to a range of transmission power, a central portion in which the radio signal is transmitted within said power range and a final portion in which the radio signal decreases in power from said power range, wherein at least one of the first and second sequences of training symbols gives rise to a modulation of the radio signal of the burst outside the central portion, and wherein the receiver receiving a signal segment corresponding to a burst formed from a symbol block executes the steps of:
   estimating first demodulation parameters on the basis of the first sequence of training symbols and the start of the signal segment;
   calculating first estimations of the information symbols of said block on the basis of the first demodulation parameters and the signal segment scanned from start to end;
   estimation of second demodulation parameters on the basis of the second sequence of training symbols and the end of the signal segment; and
   calculation of second estimations of the information symbols of said block on the basis of the second demodulation parameters and the signal segment scanned from end to start.

2. A method as claimed in claim 1, wherein the first and second sequences of training symbols are distinct.

3. A method as claimed in claim 1, wherein the first sequence of training symbols gives rise to a modulation of the radio signal of the burst in the initial portion and the second sequence of training symbols gives rise to a modulation of the radio signal of the burst in the final portion.

4. A method as claimed in claim 1, wherein the radio signal transmitted in the initial portion of a burst before the first sequence of training symbols and the radio signal transmitted in the final portion of the burst after the second sequence of training symbols are signals resulting from baseband signals having a constant phase.

5. A method as claimed in claim 1, wherein the transmitter selects at least one of the first and second sequences of training symbols, inserted in the block from which each radio signal burst is formed, from a set of several predetermined sequences on the basis of signalling information to be transmitted to the receiver.

6. A method as claimed in claim 5, wherein said channel supports a plurality of logical channels, and wherein the signalling information on the basis of which the sequence of training symbols is selected indicates the logical channel to which the burst pertains.

7. A method as claimed in claim 5, wherein each radio signal burst is formed according to a modulation selected from a plurality of possible modulations, and wherein the signalling information on the basis of which the sequence of training symbols is selected indicates the modulation according to which the burst is formed.

8. A method as claimed in claim 7, wherein said plurality of possible modulations comprise a coded modulation and a non-coded modulation.

9. A time-division channel multiplexing radio communication transmitter, comprising means for transmitting radio signal bursts destined for at least one receiver in time slots allocated to a channel on a carrier frequency, wherein the transmission means comprise means for forming the radio signal of each burst from a block of digital symbols including training symbols provided for an estimation of demodulation parameters by the receiver and information symbols to be estimated by the receiver by a demodulation using the estimated parameters, wherein the training symbols comprise a first sequence of symbols placed at the start of the block of symbols from which each radio signal burst is formed and a second sequence of symbols placed at the end of said block, and wherein the transmission means further comprise power adjustment means controlled to provide each radio signal burst with an initial portion in which the radio signal rises in power up to a range of transmission power, a central portion in which the radio signal is transmitted within said power range and a final portion in which the radio signal decreases in power from said power range, whereby at least one of the first and second sequences of training symbols gives rise to a modulation of the radio signal of the burst outside the central portion.

10. A transmitter as claimed in claim 9, wherein the first and second sequences of training symbols are distinct.

11. A transmitter as claimed in claim 9, wherein the radio signal transmitted in the initial portion of a burst before the first sequence of training symbols and the radio signal transmitted in the final portion of the burst after the second sequence of training symbols are signals resulting from baseband signals having a constant phase.

12. A transmitter as claimed in claim 9, further comprising means for selecting at least one of the first and second sequences of training symbols, inserted in the block of symbols from which each radio signal burst is formed, from a set of several predetermined sequences on the basis of signalling information to be transmitted to the receiver.

13. A transmitter as claimed in claim 12, wherein said channel supports a plurality of logical channels, and wherein the signalling information on the basis of which the sequence of training symbols is selected indicates the logical channel to which the burst pertains.

14. A transmitter as claimed in claim 12, further comprising modulating means for forming each radio signal burst according to a modulation selected from a plurality of possible modulations, and wherein the signalling information on the basis of which the sequence of training symbols is selected indicates the modulation according to which the burst is formed.

15. Transmitter as claimed in claim 14, wherein said plurality of possible modulations comprise a coded modulation and a non-coded modulation.

\* \* \* \* \*